(12) United States Patent
Hagiwara (10) Patent No.: US 8,300,271 B2
(45) Date of Patent: Oct. 30, 2012

(54) IMAGE PROCESS SYSTEM, IMAGE PROCESS METHOD AND IMAGE PROCESS PROGRAM

(75) Inventor: Takahiro Hagiwara, Chiba (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/399,964

(22) Filed: Feb. 17, 2012

(65) Prior Publication Data

US 2012/0147400 A1 Jun. 14, 2012

Related U.S. Application Data

(62) Division of application No. 11/277,217, filed on Mar. 22, 2006, now Pat. No. 8,144,363.

(51) Int. Cl.
*H04N 1/40* (2006.01)
(52) U.S. Cl. .......... 358/1.9; 358/464; 358/463; 358/468
(58) Field of Classification Search .......... 358/463–466, 358/498, 1.9, 500, 400, 504, 406, 2.1
See application file for complete search history.

(56) References Cited

U.S. PATENT DOCUMENTS

| 5,075,787 | A | 12/1991 | Shaughnessy et al. |
| 5,467,134 | A | 11/1995 | Laney et al. |
| 5,717,839 | A | 2/1998 | Ichikawa |
| 6,665,425 | B1 | 12/2003 | Sampath et al. |

FOREIGN PATENT DOCUMENTS

| JP | 10-051641 | 2/1998 |
| JP | 2003-250109 | 5/2003 |

*Primary Examiner* — Thomas D Lee
*Assistant Examiner* — Stephen M Brinich
(74) *Attorney, Agent, or Firm* — Patterson & Sheridan, LLP (57) ABSTRACT

An image process system applies a specific process to image data inputted via an input device and outputs the image data, to which the specific process has been applied, to an output device. The system includes: an input information acquisition portion that acquires information about the input device through which the image data is inputted; an output information acquisition portion that acquires information about the output device to which the image data inputted via the input device is to be outputted; a process execution portion that executes the specific process to the image data inputted via the input device on the basis of the information acquired by the input information acquisition portion and the output information acquisition portion; and a data output portion that outputs the image data, to which the specific process has been applied in the process execution portion, to the output device.

8 Claims, 6 Drawing Sheets

```
○INPUT IMAGE INFORMATION:
    ○DEVICE:      600 dpi SCANNER
    ○MEDIUM:      PAPER
    ○FORMAT:      RAW FORMAT ○OUTPUT IMAGE INFORMATION:
    ○DEVICE:      ELECTRONIC PAPER (1)
    ○MEDIUM:      ELECTRONIC PAPER (1)
    ○FORMAT:      RAW FORMAT

○SPECIFIED USE:   SAVE CHARACTER INFORMATION
```

COPY BETWEEN PAPER AND ELECTRONIC PAPER

FIG.5

```
○INPUT IMAGE INFORMATION:
    ○DEVICE:        600 dpi SCANNER
    ○MEDIUM:        PAPER
    ○FORMAT:        RAW FORMAT ○OUTPUT IMAGE INFORMATION:
    ○DEVICE:        USB MEMORY
    ○MEDIUM:        128-MB FLASH MEMORY
    ○FORMAT:        PDF FORMAT

○SPECIFIED USE:    SAVE IN COMPACT SIZE
```

COPY BETWEEN PAPER AND USB MEMORY

FIG.6

```
○INPUT IMAGE INFORMATION:
    ○DEVICE:        NETWORK
    ○MEDIUM:        HDD
    ○FORMAT:        PDF FORMAT

○OUTPUT IMAGE INFORMATION:
    ○DEVICE:        NETWORK
    ○MEDIUM:        HDD
    ○FORMAT:        PDF FORMAT

○SPECIFIED USE:    DISPLAY BY PROJECTOR
```

COPY BETWEEN HDD IN PC AND HDD IN PC

FIG.7

○ INPUT IMAGE INFORMATION:
  ○ DEVICE:      NETWORK
  ○ MEDIUM:      HDD
  ○ FORMAT:      PDF FORMAT

○ OUTPUT IMAGE INFORMATION:
  ○ DEVICE:      ELECTROPHOTOGRAPHIC PRINTER
  ○ MEDIUM:      PAPER
  ○ FORMAT:      RAW FORMAT

○ SPECIFIED USE:  ASSIGN PRIORITY TO SECURITY
                  SAVE CHARACTER INFORMATION

COPY BETWEEN PDF DATA AND PAPER

FIG.8

IMAGE PROCESS SYSTEM, IMAGE PROCESS METHOD AND IMAGE PROCESS PROGRAM

CROSS-REFERENCE TO RELATED APPLICATION

This application is a divisional of U.S. patent application Ser. No. 11/277,217 filed Mar. 22, 2006, the entire contents of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to an image process system, and more particularly, to a process applied to image data inputted via an input device.

2. Description of the Related Art

As one image process method for an open system compatible to more than one kind of input device and output device, a method disclosed in JP-A-10-51641 is used, by which a stable playback image is outputted using a profile that corrects the MTF (Modulation Transfer Function) characteristic set in an input device or an output device.

Recording media of various types are becoming available in recent years, and in a case where image data recorded in such multi-use recording media is copied from one medium to another, a stable playback image can be obtained by appropriately correcting colors and density using the ICC (International Color Consortium) profile and by correcting sharpness using the profile disclosed in the related art that corrects the MTF.

The related art, however, aims to obtain a playback image identical with the original image, and therefore fails to achieve an image process the user intended in some cases. In such a case, the user has to process and edit image data in question using application software or the like on a PC or the like. This poses an impediment in reducing the number of man-hours.

The invention was devised to solve the problems as discussed above, and therefore has an advantage to provide a technique for outputting image data by applying a process that suits an input condition or an output condition to the image data.

DETAILED DESCRIPTION OF THE INVENTION

Hereinafter, embodiments of the present invention will be described with reference to the drawings.

Throughout this description, the embodiments and examples shown should be considered as exemplars, rather than limitations on the apparatus, methods, and programs of the present invention.

Figure 1:
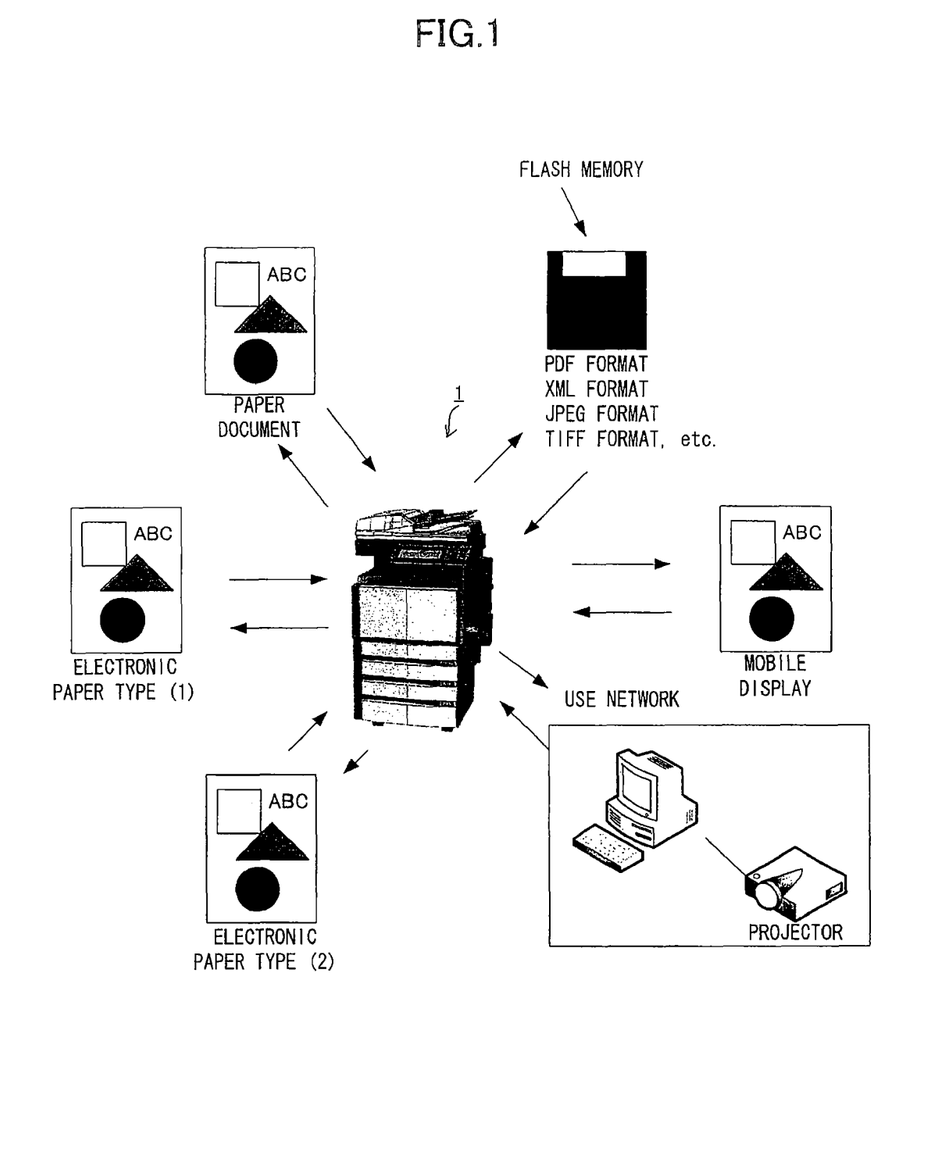
FIG. 1 is a view used to describe the configuration of a network to which an image process system according to one embodiment is applied.

FIG. 1 is a view used to describe the configuration of a network to which an image process system according to one embodiment is applied.

Nowadays, images subjected to a scan process, a printing process, a copying process, and the like are not limited to documents printed in ink on sheets of paper, but often include electronic image data stored in an IC memory, an HDD in the PC, or the like in the form of electronic data images. In addition, it is highly likely that various types of mobile displays or the like with excellent portability using electronic paper and EL (Electro Luminescence), which are expected to come into widespread use, are subjected to the process described above (see FIG. 1).

Figure 2:
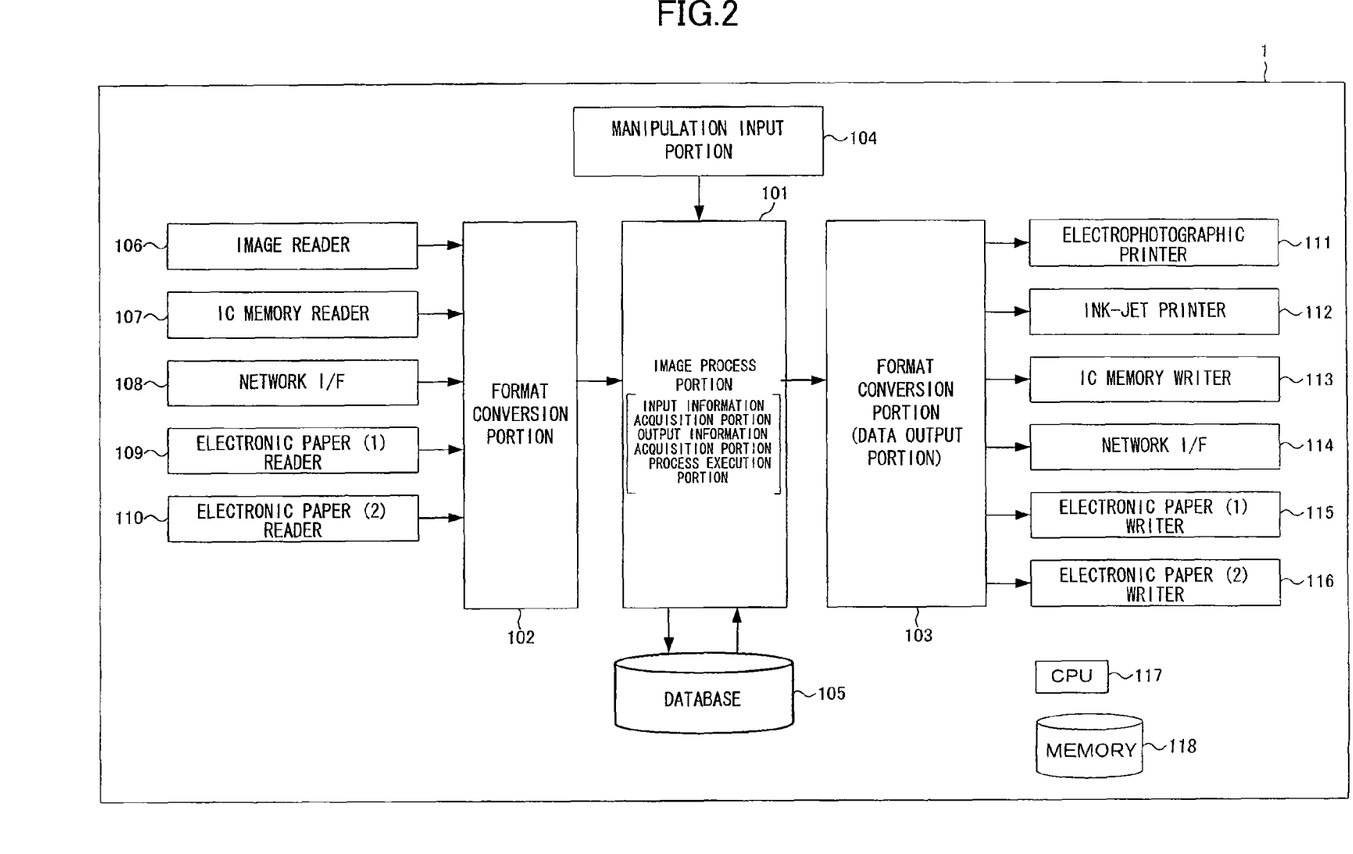
FIG. 2 is a functional block diagram used to describe the image process system according to one embodiment.

FIG. 2 is a functional block diagram used to describe the image process system according to this embodiment. The image process system of this embodiment comprises, for example, an MFP (Multi-Function Peripheral), and includes an image process portion (input information acquisition portion, output information acquisition portion, and process execution portion) 101, a format conversion portion 102, a format conversion portion (data output portion) 103, a manipulation input portion 104, a database 105, an image reader 106, an IC memory reader 107, a network I/F 108, an electronic paper (1) reader 109, an electronic paper (2) reader 110, an electrophotographic printer 111, an ink-jet printer 112, an IC memory writer 113, a network I/F 114, an electronic paper (1) writer 115, an electronic paper (2) writer 116, a CPU 117, and a memory 118. The image process system 1 configured in this manner plays a role of applying a specific process to image data inputted via an input device and outputting image data, to which the specific process has been applied, to an output device.

In the image process system 1 of this embodiment, the image reader 106 that generates image data by optically reading documents, the IC memory reader 107, the network I/F 108, the electronic paper (1) reader 109, and the electronic paper (2) reader 110 play a role as an input device that inputs images recorded in various recording media into the image process system 1 as image data. Besides the foregoing, examples of an available input device include a facsimile receiver that generates image data by combining coded data sent from a public line or the like, a RIP processor that generates image data by interpreting and rendering PDL (Page Description Language) sent from the network or the like, an electronic media reader/writer that performs reading and writing of image data from a CD-ROM or a memory card, such as a compact flash memory card.

The electrophotographic printer 111, the ink-jet printer 112, the IC memory writer 113, the network I/F 114, the electronic paper (1) writer 115, and the electronic paper (2) writer 116 play a role as an output device that outputs image data to which the specific process has been applied in the image process system 1. Besides the foregoing, examples of an available output device include a facsimile receiver and the like.

The format conversion portion 102 plays a role of converting input image data to raw data by analyzing the format thereof and converting the raw data to various formats.

The manipulation input portion 104 accepts an input of information about the use of image data to be outputted to the output device, to which the specific process has been applied in the image process system 1, and an input of information that specifies an output device as the output destination to which the user wishes the image data to be outputted. The manipulation input portion 104 comprises a keyboard, a mouse, or the like herein, and accepts a user's manipulation input. Assume that the manipulation input portion 104 comprises a touch panel display herein, and it is therefore not only capable of accepting a user's manipulation input, but also capable of displaying screens for various kinds of information.

The image process portion 101 plays a role of acquiring information about image data inputted via the input device as described above. Examples of information acquired by the image process portion 101 include information about the input device through which image data is inputted, a data format or a data size of image data inputted via the input device, information about the output device from which image data inputted via the input data is to be outputted, information about the use accepted at the manipulation input portion 104, information about a data writing capacity of the output device, and so forth.

The image process portion 101 is also able to judge the paper type of documents on the basis of background images in image data read from the documents by the image reader 106 for the judged paper type to be acquired as information about the image data.

The image process portion 101 applies the most appropriate process to the image data inputted via the input device on the basis of the information acquired as described above. Examples of the specific process that the image process portion 101 applies to the image data include a resolution conversion process, a color system conversion process, a contrast correction process, a brightness correction process, a color saturation correction process, a hue correction process, a density correction process, a gray-scale correction process, a sharpness characteristic correction process, and so forth.

After the most appropriate image process is applied to the image data as described above, the processed image data is stored temporarily in the memory 118. In this instance, the image data is converted to data in an appropriate image data format on the basis of the raw data to which the image process has been applied and its appended information as well as "output device" and "specified use" specified by the user. As has been described, the image process portion 101 converts input image data to printable image data or image data as the user intended, adjusts the colors, the brightness, the definition, and so forth of the image, and performs conversion by identifying an image so as to obtain a better playback image according to the identification result.

The format conversion portion 103 outputs the image data, to which the specific process has been applied in the image process portion 101, to the output device. The format conversion portion 103 outputs the image data converted as described above by reading out the image data from the memory 118 at an output rate of the output device.

Figure 3:
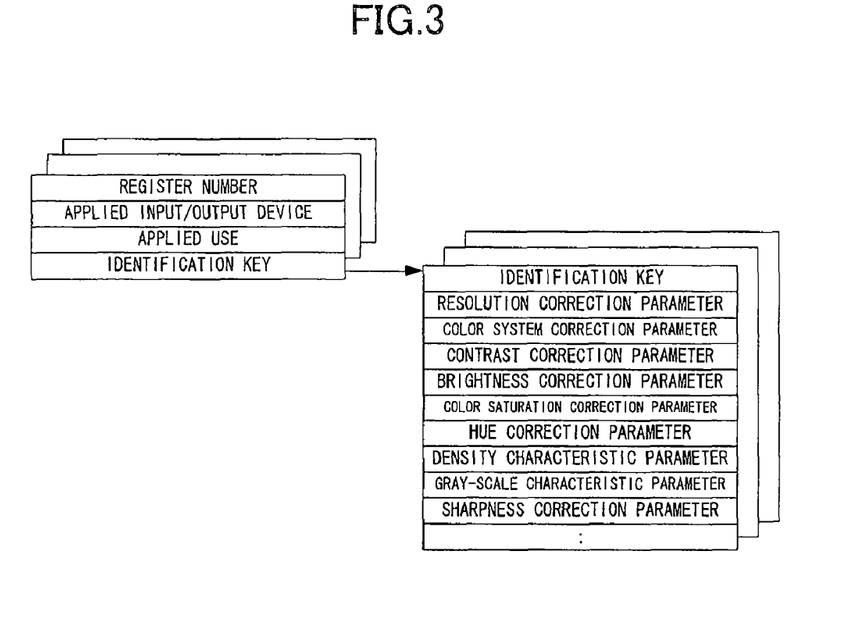
FIG. 3 is a view used to describe information stored in a database 105 in detail.

The database 105 has stored information about the input device, the output device, and the use of image data (applied use), as well as an identification key assigned to each item of image data, and a register number of each item of image data as are shown in FIG. 3. The identification key assigned to each item of image data has stored parameter information used for a corresponding specific process, such as a resolution correction parameter, a color system correction parameter, a contract correction parameter, a brightness correction parameter, a color saturation correction parameter, a hue correction parameter, a density correction parameter, a gray-scale correction parameter, and a sharpness correction parameter.

The CPU 117 plays a role of performing various processes in the image process system, and also plays a role of achieving various functions of executing programs stored in the memory 118. The memory 118 comprises, for example, a ROM or a RAM, and plays a role of storing various kinds of information and programs used in the image process system.

This embodiment describes an example where the respective components forming the image process system 1 are all disposed inside the image process system 1. However, the invention is not limited to this example, and the respective components forming the image process system of this embodiment can be disposed at any location as long as mutual communications are enabled.

A concrete example of operations of the image process system 1 according to this embodiment will now be described.

Figure 4:
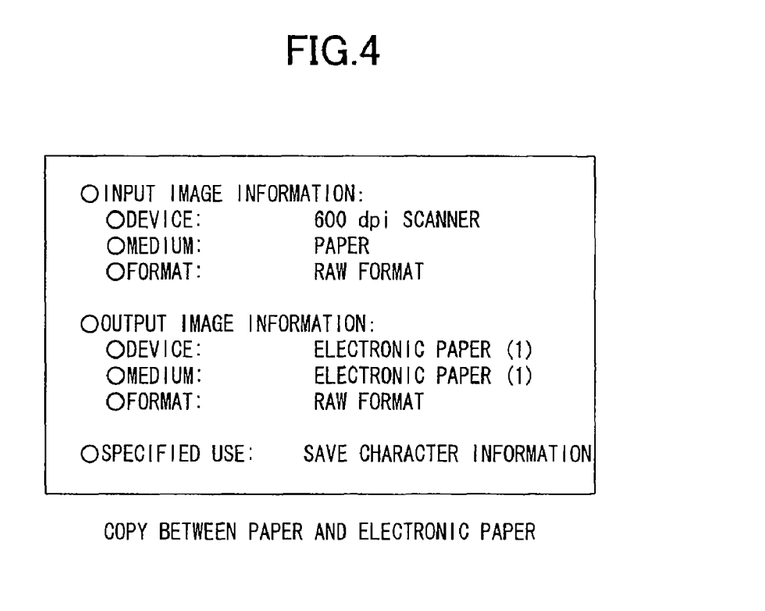
FIG. 4 is a view showing an example where an image reader 106 is used as an input device through which an image is inputted, and the image is outputted by an electronic paper (1) writer in the form of an electronic paper type (1).

FIG. 4 is a view showing an example where the image reader 106 is used as an input device through which an image is inputted, and the image is outputted by the electronic paper (1) writer in the form of the electronic paper type (1). The use of the output electronic paper specified at the manipulation input portion 104 is "save character information".

In this case, the resolution and the contrast of the electronic paper may possibly be poor in comparison with a paper medium. Hence, in the presence of characters in a color background, the image process portion 101 applies an image process such that highlights the characters by slightly reducing the density of the background color. When it is judged that the characters are not written by hand through the layout analysis or the like, it may apply an OCR process or displays the highlighted characters in bold type on the electronic paper.

Figure 5:
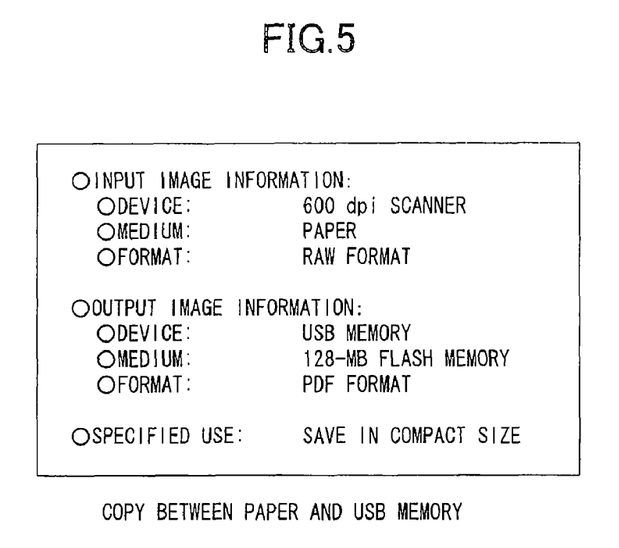
FIG. 5 is a view showing an example where an IC memory reader 107 is used as a device through which an image is inputted, and the image is outputted to a USB memory in the PDF format by an IC memory writer 113.

FIG. 5 is a view showing an example where the IC memory reader 107 is used as a device through which an image is inputted, and the image is outputted to a USB memory in the PDF format by the IC memory writer 113.

In such a case where image data is outputted to a portable storage medium, in order to reduce a data volume to the extent possible, the document structure of the image data to be outputted is analyzed for the OCR process to be applied to a character portion as a rule. A digitalization process is applied to an image in a portion with a poor identification rate or in a line drawing portion, and a compression process is applied to the digitalized image using a compression method appropriate for the digitalized image.

In addition, a color subtractive process is applied to the image in a picture portion or in a filled-in portion as much as possible, and a data volume is reduced to the extent possible using more than one image compression method for the image to be outputted to and stored in the USB memory.

It goes without saying that the image process portion 101 may switch at least one of the compression method of the image data and a compression rate of the image data depending on a writable capacity (herein, 128 MB) of a recording medium, such as a USB memory, used as the output device.

Figure 6:
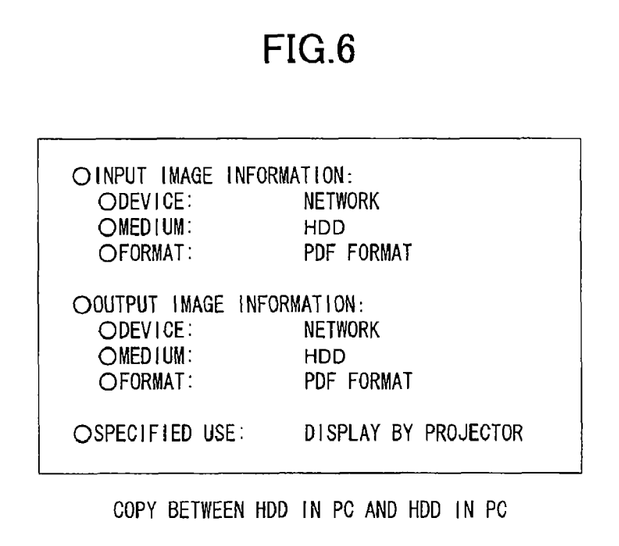
FIG. 6 is a view showing an example where image data stored in an HDD in a PC is received using a network I/F 108 as a device through which an image is inputted, and the image data is outputted again to the HDD in the PC by a network I/F 114.

FIG. 6 is a view showing an example where image data stored in the HDD in the PC is received using the network I/F 108 as a device through which an image is inputted, and the image is outputted again to the HDD in the PC via the network I/F 114. In this case, because the use of the image data to be outputted from the image process system 1 is "display by projector", the image process portion 101 not only converts the image data to the most appropriate RGB color system, but also applies a brightness adjustment and a contrast adjustment that matches with a dynamic range of the projector, a process to replace colors close to primary colors with primary colors, and so forth.

Figure 7:
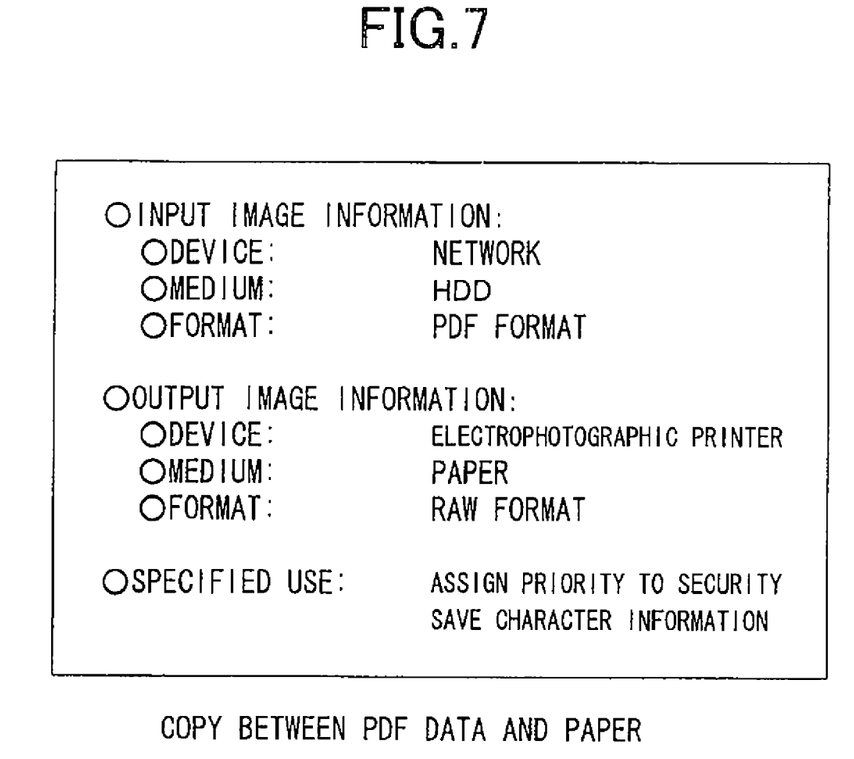
FIG. 7 is a view showing an example where image data stored in an HDD in a PC is received using the network I/F 108 as a device through which an image is inputted, and the image data is outputted in print on a paper medium by an electrophotographic printer 111.

FIG. 7 is a view showing an example where image data stored in the HDD in the PC is received using the network I/F 108 as a device through which an image is inputted, and the image data is outputted in print on a paper medium by the electrophotographic printer 111. Because the use of the image data to be outputted from the image process system 1 herein is "assign priority to security" and "save character information", the image process portion 101 applies an image process, such as tint block printing and a process that prints out the image data by superimposing an overlay image thereon. In this manner, the use of the output image data can be specified by making a choice from several kinds of use at the manipulation input portion 104. In a case where security settings of some kind (restriction imposed on the opening, printing, and editing of a file) are made for the image data inputted via the input device, it is preferable to make the similar security settings for the image data to be outputted. Examples of a method for making security settings for the image data to be outputted to the output device include an encryption process or an attachment of an electronic signature.

In a case where image data inputted via the input device is the one read from electronic paper by the electronic paper (1) reader 109 or the electronic paper (2) reader 110, the image process portion 101 is also able to judges the type of electronic paper on the basis of pixels of the electronic paper for the judged type to be acquired as information about the image data.

The image process portion 101 is also able to apply the OCR process to the image data read from documents by the image reader 106 for a keyword extracted by the image reader 106 through the OCR process to be acquired as information about the image data.

Besides the foregoing, by applying the document structure analyzing process or the like to the input image data, it is possible to analyze the layout of the image data and classify the image data to characters, a picture, a line drawing, gradation, and so forth for them to be used as information for setting parameters when following processes are performed.

In a case where application software used when handling image data is limited in the output device, the image process portion 101 may convert the image data into image data in a format that can be edited by the application software first and then outputs the image data.

Figure 8:
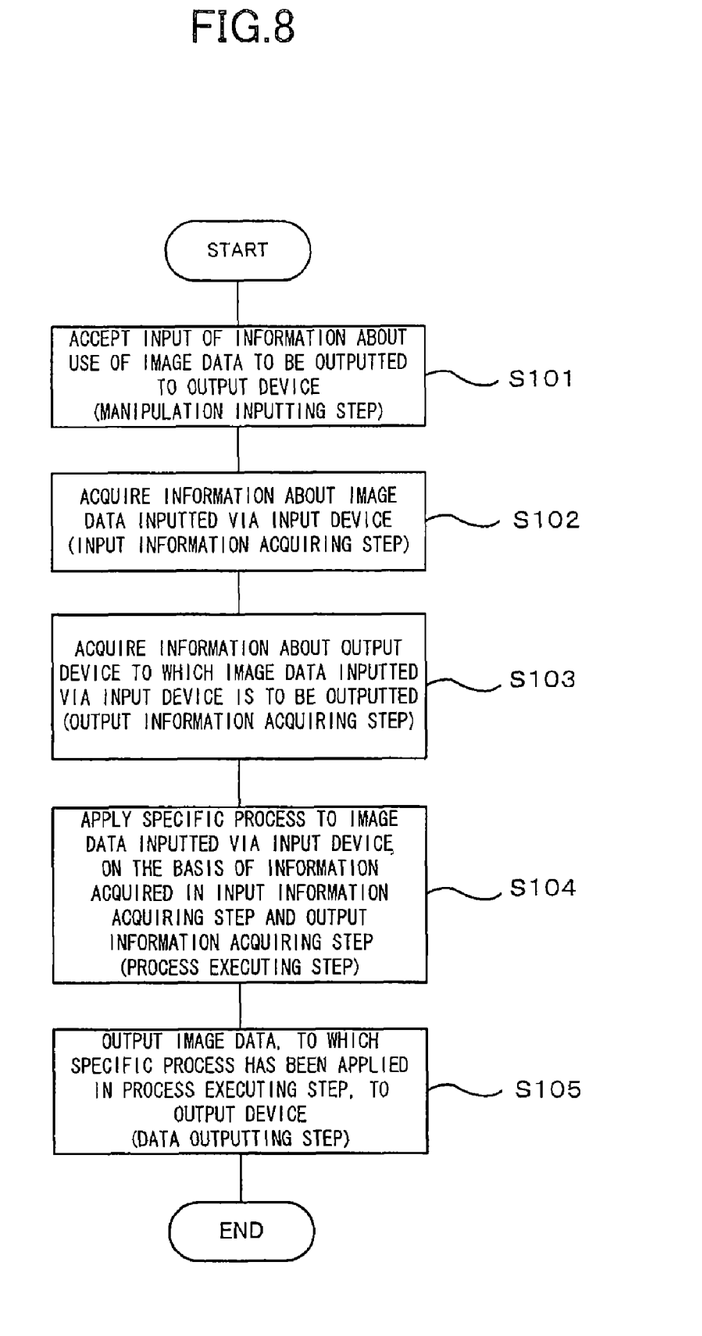
FIG. 8 is a flowchart used to describe the flow of the procedure (image process method) briefly in the image process system according to one embodiment.

FIG. 8 is a flowchart used to describe the flow of the procedure (image process method) briefly in the image process system of this embodiment.

Initially, an input of information about the use of image data to be outputted to the output device is accepted at the manipulation input portion 104 (manipulation inputting step) (S101).

The image process portion 101 acquires information about the image data to be inputted via the input device (input information acquiring step) (S102). In the input information acquiring step, the type of paper of documents is judged on the basis of the background image in the image data read from the documents by the image reader, and the judged type is acquired as information about the image data. Also, in a case where the image data inputted via the input device is the one read from the electronic paper, the type of the electronic paper is judged on the basis of pixels of the electronic paper, and the judged type is acquired as information about the image data in the input information acquiring step. In addition, in the input information acquiring step, the OCR process is applied to the image data read from the documents by the image reader 106, and a keyword extracted by the image reader 106 through the OCR process is acquired as information about the image data.

Subsequently, the image process portion 101 acquires information about the output device to which the image data inputted via the input device is be outputted (output information acquiring step) (S103). To be more concrete, in the output information acquiring step, various kinds of information, such as information about the use accepted in the manipulation inputting step, are acquired. Also, in the output information acquiring step, it is also possible to acquire information about a data writing capacity of the output device.

Subsequently, the image process portion 101 applies a specific process to the image data inputted via the input device on the basis of information acquired in the input information acquiring step and the output information acquiring step (process executing step) (S104).

The format conversion portion 103 then outputs the image data, to which the specific process has been applied in the process executing step, to the output device (data outputting step) (S105).

In the embodiment above, an example where information about the image data to be inputted and information about the input device have been acquired before the acquisition of information about the output device. The invention, however, is not limited to the example, and it is sufficient to acquire the foregoing information before the most appropriate process is chosen in the process executing step, and it may be configured to acquire the foregoing information after the acquisition of the information about the output device. Alternatively, in a case where the information can be known in advice, for example, in a case where only one input device is used, necessary information may be inputted in the input information acquiring step before the inputting process.

Also, an example where the input device and the output device are disposed inside the image process system 1 has been described herein. The invention, however, is not limited to the example, and it may be configured in such a manner so as to dispose these components outside the image process system 1. In other words, it is sufficient to acquire information about the input and output devices from appended data or the like accompanying the image data inputted and outputted by the image process system 1, and the input device and the output device can be therefore disposed at any location.

The respective steps in the processes of the image process system described above can be achieved by executing the image process program stored in the memory 118 on the CPU 117.

This embodiment has described a case where the capability of implementing the invention is pre-recorded in the device. The invention, however, is not limited to this case, and the same capability may be downloaded to the device via a network, or a recording medium having stored the same capability may be installed in the device. The recording medium can be of any type as long as it is a device-readable recording medium capable of storing a program, such as a CD-ROM. The capability achieved as it is pre-installed or downloaded as described above may be the one that exerts its capability in cooperation with the OS (Operating System) within the device.

As has been described, according to this embodiment, the user becomes able to apply the data process that best suits the use to the input image data without the need of a process using a PC or the like for the image data to be outputted. In other words, it is possible to output an image to which a process and a correction that suits the user's use method has been applied, instead of merely outputting the image data identical with the original image data intact.

While the present invention has been described in detail by way of particular embodiments, it is obvious that various modifications and alternations occur to those skilled in the art without deviating from the sprit and the scope of the present invention.

As has been described in detail above, according to the invention, it is possible to provide a technique for outputting image data by applying a process that suits an input condition and an output condition to the image data.

What is claimed:

1. An image processing system comprising:
   an input information acquisition portion that judges a paper type of a document on the basis of a background image in image data read from the document by an image reader and acquires the paper type as information about the image data;
   a manipulation input portion that accepts a manipulation input of information about a purpose for using the image data to be outputted to an output device;
   an output information acquisition portion that acquires the information about the purpose for using the image data accepted by the manipulation input portion and acquires information about the output device that is different from the information acquired by the input information acquisition portion, to which the image data inputted via the image reader is to be outputted;
   a process execution portion that executes a specific process on the image data inputted via the image reader on the basis of the information acquired by the input information acquisition portion and the information acquired by the output information acquisition portion; and
   a data output portion that outputs the image data, to which the specific process has been applied in the process execution portion, to the output device.

2. The image processing system according to claim 1, wherein:
   the specific process reduces the density of a background color.

3. The image processing system according to claim 1, wherein:
   the specific process includes a contrast adjustment.

4. The image processing system according to claim 1, wherein:
   the output information acquisition portion acquires information about a data writing capacity of the output device; and
   the process execution portion executes a compression process by choosing at least one of a compression method of the image data and a compression rate of the image data on the basis of the data writing capacity of the output device acquired by the output information acquisition portion.

5. An image processing method comprising:
   an input information acquiring step of judging a paper type of a document on the basis of a background image in image data read from the document by an image reader and acquiring the paper type as information about the image data;
   a manipulation inputting step of accepting a manipulation input of information about a purpose for using the image data to be outputted to an output device;
   an output information acquiring step of acquiring the information about the purpose for using the image data accepted in the manipulation inputting step and acquiring information about the output device that is different from the information acquired in the input information acquiring step, to which the image data inputted via the image reader is to be outputted;
   a process executing step of executing a specific process on the image data inputted via the image reader on the basis of the information acquired in the input information acquiring step and the information acquired in the output information acquiring step; and
   a data outputting step of outputting the image data, to which the specific process has been applied in the process executing step, to the output device.

6. The image processing method according to claim 5, wherein:
   the specific process reduces the density of a background color.

7. The image processing method according to claim 5, wherein:
   in the output information acquiring step, information about a data writing capacity of the output device is acquired; and
   in the process execution step, a compression process is performed by choosing at least one of a compression method of the image data and a compression rate of the image data on the basis of the data writing capacity of the output device acquired in the output information acquiring step.

8. The image processing method according to claim 5, wherein:
   the specific process includes a contrast adjustment.

* * * * *